United States Patent
Matthews

(10) Patent No.: US 11,540,005 B2
(45) Date of Patent: Dec. 27, 2022

(54) SYSTEMS AND METHODS FOR RECORDING RELEVANT PORTIONS OF A MEDIA ASSET

(71) Applicant: Rovi Guides, Inc., San Jose, CA (US)

(72) Inventor: Sean Matthews, Los Altos, CA (US)

(73) Assignee: Rovi Product Corporation, San Jose, CA (US)

( * ) Notice: Subject to any disclaimer, the term of this patent is extended or adjusted under 35 U.S.C. 154(b) by 0 days.

(21) Appl. No.: 17/177,709

(22) Filed: Feb. 17, 2021

(65) Prior Publication Data

US 2021/0176521 A1   Jun. 10, 2021

Related U.S. Application Data

(63) Continuation of application No. 16/787,297, filed on Feb. 11, 2020, now Pat. No. 10,958,970, which is a continuation of application No. 16/222,672, filed on Dec. 17, 2018, now Pat. No. 10,602,215.

(51) Int. Cl.
| | |
|---|---|
| *H04N 21/433* | (2011.01) |
| *G10L 15/22* | (2006.01) |
| *G10L 25/57* | (2013.01) |
| *H04N 21/439* | (2011.01) |
| *H04N 21/45* | (2011.01) |
| *G06F 16/41* | (2019.01) |
| *G06F 16/432* | (2019.01) |
| *H04N 21/472* | (2011.01) |

(52) U.S. Cl.
CPC ......... *H04N 21/4334* (2013.01); *G06F 16/41* (2019.01); *G06F 16/433* (2019.01); *G10L 15/22* (2013.01); *G10L 25/57* (2013.01); *H04N 21/4394* (2013.01); *H04N 21/4532* (2013.01); *H04N 21/47214* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 2008/0201146 A1* | 8/2008 | Essenmacher | G10L 15/05 704/252 |
| 2014/0280265 A1* | 9/2014 | Wang | H04H 60/37 707/758 |
| 2019/0147091 A1* | 5/2019 | Wei | G06F 16/258 707/780 |

* cited by examiner

*Primary Examiner* — Eileen M Adams
(74) *Attorney, Agent, or Firm* — Haley Guiliano LLP

(57) ABSTRACT

Systems and methods are presented herein for recording portions of a media asset relevant to recording criteria. A media application receives input indicating the recording criteria and identifying a first keyword. The media application accesses a data structure to identify a first node associated with the first keyword. The data structure includes the first node and a plurality of nodes connected to the first node via a plurality of paths. The media application receiving audio component data for a portion of the media asset extracts a term from the audio component data, and identifies a second node in the data structure that is associated with the extracted term. The media application calculates a path score for the portion of the media asset based on a path size in the data structure between the first node and the second node. When the score is high enough, the portion of the media asset is recorded.

16 Claims, 13 Drawing Sheets

SYSTEMS AND METHODS FOR RECORDING RELEVANT PORTIONS OF A MEDIA ASSET

CROSS-REFERENCE TO RELATED APPLICATIONS

This application is a continuation of U.S. patent application Ser. No. 16/787,297, filed Feb. 11, 2020, which is a continuation of U.S. patent application Ser. No. 16/222,672, filed Dec. 17, 2018, now U.S. Pat. No. 10,602,215, the disclosures of which are hereby incorporated by reference herein in their entireties.

BACKGROUND

This disclosure is generally directed to media systems configured to selectively record portions of a media asset. In particular, methods and systems are provided for improved selection of relevant portions of a media asset based on analysis of the audio component data of the media asset.

SUMMARY

Media systems commonly record media assets that are explicitly requested by the user. To accomplish this task, media systems typically rely on metadata that accompanies the media asset. For example, if the user requested a recording of a certain genre (e.g., sports), the media system may check metadata of a media asset being transmitted and record it only if the metadata includes a matching genre tag. Media assets are often transmitted, however, without any kind of accompanying metadata, making the technique difficult, or even impossible, to execute. Furthermore, a single media asset may include different portions, each with its own content. Such portions will typically lack any kind of portion-specific metadata. For example, a news show may have a political segment and a sport segments and may lack metadata identifying when such segments begin and end. This is a particularly common problem for live transmissions. In such circumstances, conventional systems, due to the lack of metadata, may be unable to record only portions of the media segment that are related to "sports."

Accordingly, to overcome these problems, systems and methods are provided herein for identifying relevant portions of a media asset based on analyzing the audio component data of the media asset using a relationship data structure (e.g., a knowledge graph) that includes multiple connected nodes corresponding to keywords and concepts. By analyzing the audio component data using the knowledge graph, systems and methods described herein are able to identify relevant portions of the media asset without relying on additional metadata and further allowing for identification of relevant portions in media assets that are transmitted live and do not contain any metadata that can be used to identify relevant portions. The relevant portions may be recorded once they are identified, while the irrelevant portions are not recorded (or are marked as irrelevant). Accordingly, such methods allow the user to watch only a collection of portions of a media asset that are relevant to the user.

In one implementation, the media system receives an input indicating recording criteria. For example, the user may be interested in recording only portions of a news show that are relevant to a quarterback on her fantasy team. The media system identifies a keyword relevant to the recording criteria, for example, the media system may determine that keyword "Eli Manning" is relevant to recording criteria, by referencing the user's fanart lineup.

Once the keyword is identified, the media system accesses a data structure that comprises multiple connected nodes. Each node may be associated with a particular keyword. The connections between nodes may be indicative of the keywords being closely related to each other. In one implementation, each connection may also include a weight representing the strength of relationship between nodes. In some embodiments, the media system accesses a data structure that comprises a first node associated with the identified keyword from the user's recording criteria.

The media system retrieves audio component data for a portion of the media asset. For example, the media system may retrieve closed captioning data of a first segment of a news show. In another example, the media system may retrieve audio data of the first segment of a news show and perform speech-to-text-analysis to acquire audio component data of the portion of the media asset. The media system may then extract a term from the audio component data. For example, media system may extract the first noun of the audio component data. The media system may identify a second node in the data structure (e.g., a knowledge graph) that is associated with the extracted term. Once the second node is identified, the media system may traverse the data structure to identify a path between the first and second nodes. The size of the path is used to calculate the path score of the portion of the media asset to the keyword. In some embodiments, if the score is sufficiently high, that portion of the media asset is recorded.

In some embodiments, each term of the portion of the media asset is analyzed in the aforementioned manner. For example, the media system may identify a node in the data structure for each term of the audio component data. For each such node, a path is identified to the first node associated with the keyword, and the size of the path is calculated. The path score may take into account all such path sizes. For example, the media system may calculate an average size of all path sizes in order to compute the path score.

In some embodiments, when calculating a path size between any two nodes, the media system finds the shortest path between the two nodes. The size of the shortest path may be calculated as a number of connections in the shortest path. In another implementation, the size of the path is calculated as a total weight of connections in the shortest path. In yet another implementation, the size of the path is calculated as an average weight of connections in the shortest path. Further, a total weight may be adjusted based on types of connections in the path. For example, some types of connections may be weighted more heavily than others.

In some embodiments, the media system sets the path threshold for identifying known relevance based on corpuses of known data. For example, to identify a threshold for relevance to the keyword "sports," the media system may access a corpus of news clips known to be relevant to sports, and a corpus of news clips known to be irrelevant to sports. The media system may calculate a path score of the first corpus of data to the first keyword based on the data structure (e.g., a knowledge graph). For example, the media system may use the path score calculation technique outlined above. The media system may also calculate a path score of the second corpus of data to the first keyword based on the same data structure. The media system may select the threshold based on the two scores. For example, the threshold may be picked to be in the middle of the two scores.

In some embodiments, the media system also identifies several secondary keywords related to the first keyword. For example, if the user picked a keyword "sports," the media system may also select keywords like "football" and "baseball" as secondary words. In some embodiments, the media system determines a set of portions of the media asset relevant to each keyword and records each of the portions. The media system then creates a hierarchical menu based on the first keyword and secondary keywords. The user may be able to select any of the keywords from the hierarchy. Upon selection, only the portions of the media asset relevant to the selected keyword are played.

In some embodiments, the media system also monitors a transmission of the media asset (e.g., of a live media asset) for portions that are relevant or irrelevant to the keyword using the techniques described above. The media system may provide appropriate notification to the user, informing the user that a relevant portion of the media asset is currently being transmitted, or when the transmission of the relevant portion of the media asset has ended.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
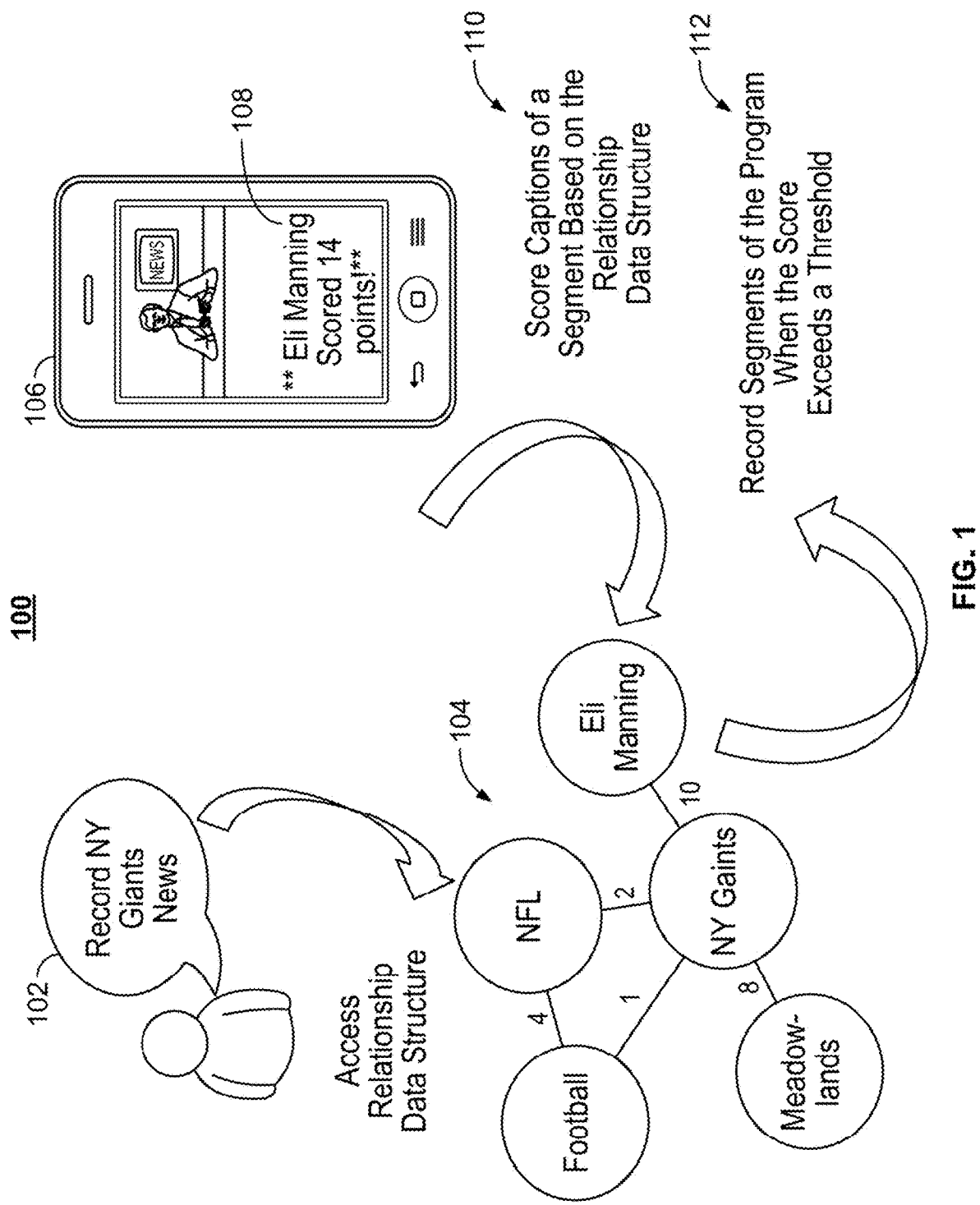
FIG. 1 shows an illustrative example of a scenario for identifying portions of a media asset for recordation based on audio component data, in accordance with some embodiments of the disclosure.

FIG. 1 shows an illustrative example of a scenario for identifying portions of a media asset for recordation based on analysis of audio component data. In some embodiments, the steps described in this example may be performed by a media application. The media application may be executing on media device 106 (e.g., smartphone of the user). In some embodiments, the media application is executing on a remote server connected to user equipment devices, on any other electronic device, or on any combination thereof.

A user may provide recording criteria to media device 106. For example, the user may issue a voice command 102 "Record New York Giants News." The media system may identify a relevant keyword based on the recording criteria. For example, the media system may extract the keyword "New York Giants" as the first noun phrase in the recording criteria. Once the keyword is identified, the media application may access a data structure 104 (e.g., a knowledge graph) relevant to the keyword. The media application may access a locally stored data structure or request the data structure from a remote source. The data structure may be a graph of connected nodes, where each node is associated with a keyword. Nodes that represent closely related keywords are connected with links. In one implementation, each connection may also have a weight representing how closely the keywords are related. The data structure 104 includes a first node associated with the identified keyword "New York Giants," allowing the media application to leverage the data structure to determine whether a particular segment of a media asset playing on device 106 is relevant to the identified keyword.

At 110, the media system may score the portion of the media content displayed on media device 106 for relevance to the selected keyword using data structure 104 (e.g., by calculating a path score). In the illustrated example, media device 106 is displaying a first scene of a news segment that includes an audio component 108 that includes the voice line "Eli Manning Scored 14 points!" The media application may extract this audio component data for that portion of the media asset. In one implementation, the audio component data is extracted from the closed captioning data. In another implementation, the audio component data is acquired by performing speech-to-text analysis of the audio signal of the news segment.

After the audio component data for the portion of a media asset is received, the media application may extract a term from the audio component data. For example, the term "Eli Manning" may be extracted. The media application may identify a second node in data structure 104 that is associated with the extracted term "Eli Manning" The media application may then identify a path size between the two nodes. For example, the media application may measure the number of hops between the two nodes, or the total weight of connections between the two nodes. In some embodiments, the media application performs this process for every term that is extracted from the audio component data. For example, the terms "Eli Manning," "Scored," and "Points" may be extracted from phrase 108. A path size in data structure 104 may be calculated for each term in the way described above. The media application may then calculate a path score based on some or all of the path sizes. For example, the path score may be based on an average of all calculated path sizes. In some embodiments, the path score may be an inverse of the average of all calculated path sizes.

At 112, if the path score meets or exceeds a threshold, the media application determines that the portion of the media asset is sufficiently relevant to the recording criteria. The media application may record the relevant portion of the media asset. In some embodiments, the media application may record all relevant portions of the media asset and refrain from recording irrelevant portions. In some embodiments, the media application provides a real-time notification to the user that a relevant portion of the media asset is playing or when a relevant portion of the media asset is about to end.

In some embodiments, if the path score is below the threshold, the media application determines that the portion of the media asset is not sufficiently relevant to the recording criteria. In this case, the media application may refrain from recording the irrelevant portion of the media asset or stop recording a portion of the media that has become identified as irrelevant. In one implementation the media application calculates the path score continuously as the media asset is being presented using a sliding window (e.g., 1-minute window) of the media asset. In this example, the media application may begin recording a portion of the media asset when the path score of the current sliding window exceeds the threshold and stop recording the portion of the media asset when the path score of current sliding window falls below the threshold.

Figure 2:
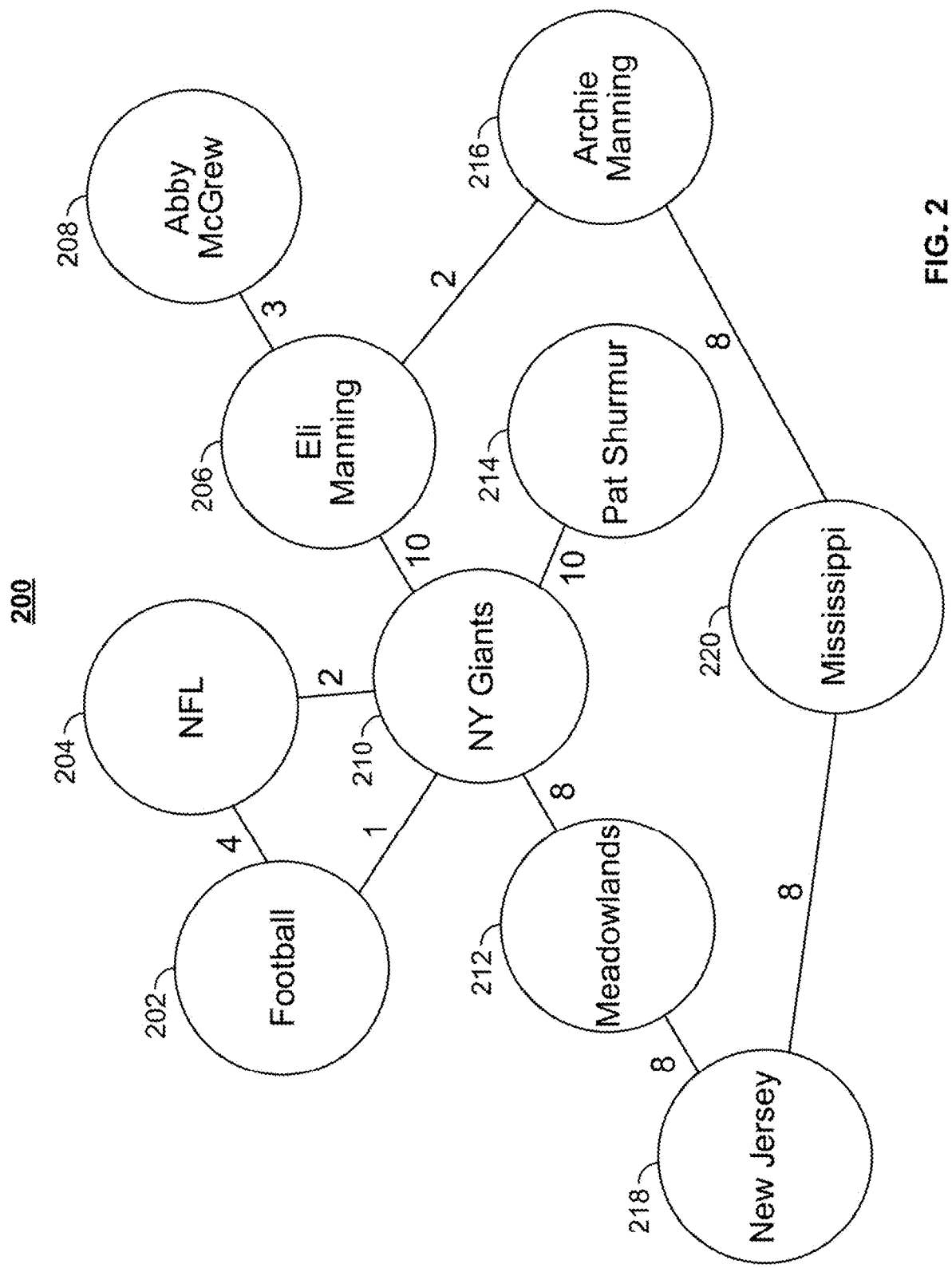
FIG. 2 shows an illustrative block diagram of a data structure that may be utilized for identifying portions of a media asset for recordation based on audio component data, in accordance with some embodiments of the disclosure.

FIG. 2 shows an illustrative block diagram of a data structure 200 (e.g., a knowledge graph) that may be utilized for identifying portions of a media asset for recordation based on audio component data, in accordance with some embodiments of the disclosure. For example, the media application of media device 106 may use the data structure 200 to make determinations regarding relevance of a portion of a media asset to a keyword (e.g., by computing a path score).

In some embodiments, data structure 200 may be created based on observed frequency of keywords occurring close to each other in audio of media assets. For example, data structure 200 may be created by analyzing a large corpus of sports media assets. Keywords that occur the most in the corpus are represented with nodes 202-220. Nodes corresponding to keywords that occur together are connected by an edge. Each edge may further have a weight representing the strength of the connection. For example, keywords that occur together most frequently may be connected by an edge with a high score, while keywords that occur together less frequently may be connected by an edge with a lower score. For example, because keywords "Football" and "NFL" occur frequently together, nodes 202 and 204 corresponding to these keywords may be connected by an edge with high-rank weight. In another example, because keywords "New York Giants" and "Eli Manning" occur less frequently together, nodes 204 and 210 corresponding to these keywords may be connected by an edge with a lower-rank weight. Some terms that almost never occur together, such as New York Giants and Mississippi may correspond to nodes 210 and 220, which are not directly connected. However, nodes 210 and 220 may be connected indirectly. For example, node 210 ("New York Giants") may be connected to node 212 ("Meadowlands") which may be connected to node 218 (New Jersey) which may be connected to node 220 ("Mississippi"). Similarly, node 214 ("Pat Shermer") may be connected to node 216 ("Archie Manning") via nodes 210 ("New York Giants") and 206 ("Eli Manning"). Data structure 200 may include node 208 ("Abby McGrew") who is the wife of Eli Manning.

In some embodiments, the media application may use data structure 200 to calculate relevance of a portion of media asset to a keyword (e.g., by calculating a path score). For example, the media application may use data structure 200 to calculate whether a portion of media asset that includes phrase "Eli Manning scored 14 points" (phrase 108 of FIG. 1) is relevant to the keyword "New York Giants." In some embodiments, the media application identifies node 210, which corresponds to keyword "New York Giants." The media application also extracts the term "Eli Manning" from the phrase and identifies a second node 206 corresponding to that term. The media application then calculates the size of the path between nodes 206 and 210. In some embodiments, the path size is measured in number of hops between nodes. In this case, the path size would be equal to "1" since nodes 210 and 206 are directly connected. In some embodiments, the path size is measured in total weight of connections between nodes 206 and 210. In this case, the path size would be "10" because that is the weight of connections between nodes 206 and 210. In some embodiments, the media application computes a path score based on the path size. For example, the path score may be inversely proportional to the path size. In some embodiments, the path size is computed for each extracted term. In some embodiments, the path score is based on the average path size of all path sizes.

In another example, the path size between two remote nodes 210 and 208 may be calculated as follows. The media application may perform a depth-first search of breadth to identify all paths between nodes 210 and 208. For example, the media application may identify path 210-206-208 and paths 220-212-218-220-216-206-208. Because path 210-206-208 only has two hops as opposed to six hops, it is selected as the shorter path. In some embodiments, the path size is measured in number of hops between nodes. In this case, the path size would be equal to "2" since nodes 210 and 208 are connected via two hops. In some embodiments, the path size is measured in total weight of connections between nodes 206 and 208. In this case the path size would be "13" (the sum of "10" and "3").

Figure 3:
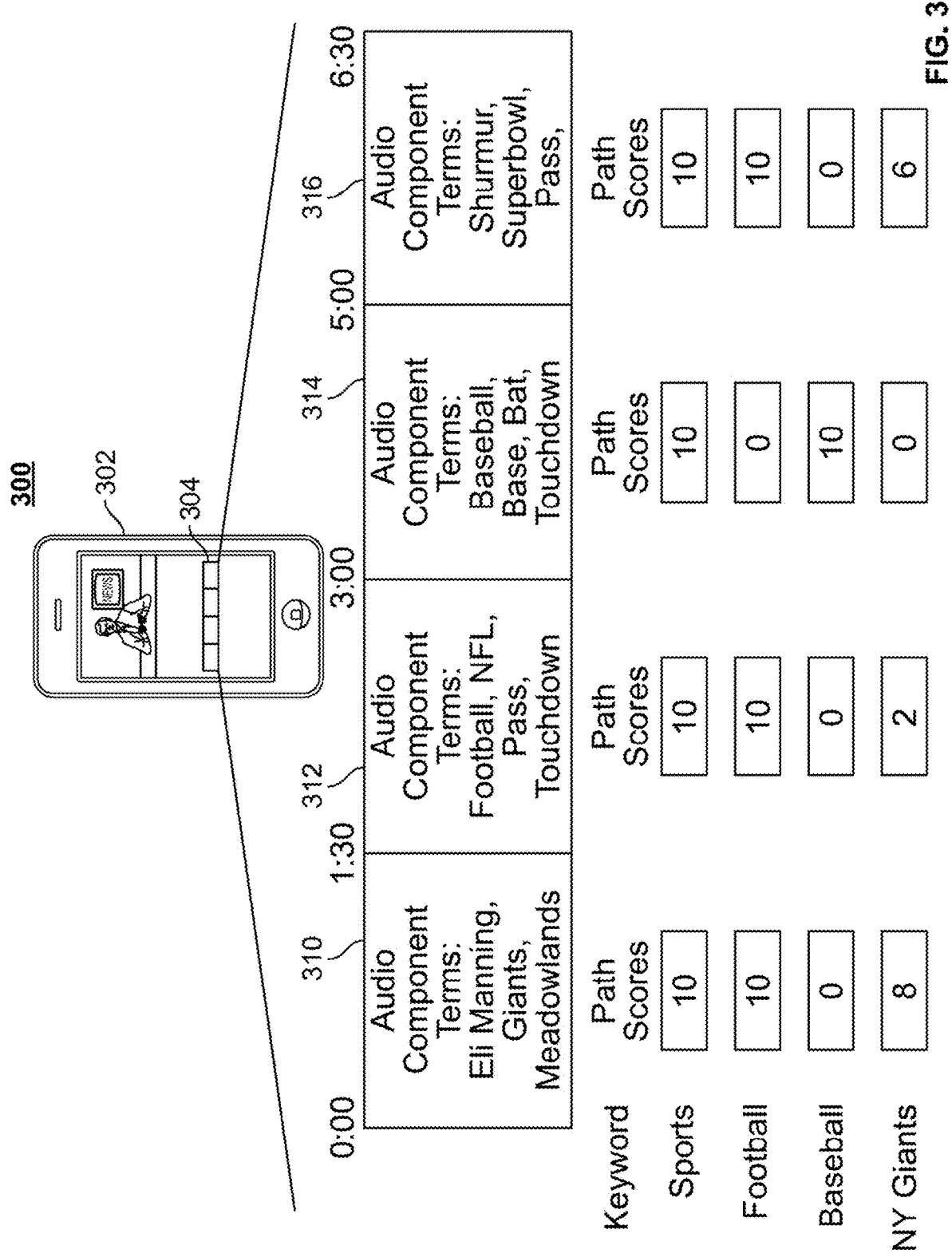
FIG. 3 shows an illustrative example of a scenario for analyzing audio component data of a media asset, in accordance with some embodiments of the disclosure.

FIG. 3 shows an illustrative example 300 of a scenario for analyzing audio component data of a media asset. In some embodiments, the steps described in this example may be performed by a media application. The media application may be executing on media device 302 (e.g., smartphone of the user). Media device 302 may be the same as device 106 of FIG. 1.

In some embodiments, the media application may analyze several segments 310, 312, 314, 316 of media asset 304 for relevance to a plurality of keywords (e.g., by calculating respective path scores). For example, if the recording criteria includes the keyword "Sports," the media application may identify several secondary keywords related to the keyword "New York Giants." For example, the media application may select several nodes from a data structure (e.g., data structure 200) that are closest to the node corresponding to the keyword "New York Giants." For example, the media application may select keywords "Football," "Baseball" and "Sports."

The media application may receive audio component data (e.g., closed captioning data) for each portion of media asset 304. For example, the media application may receive audio component data for portion 310 between time stamps 0:00 and 1:30, for portion 312 between time stamps 1:30 and 3:00, for portion 314 between time stamps 3:00 and 5:00, and for portion 316 between time stamps 5:00 and 6:30. For example, audio component data of portion 310 may include term "Eli Manning," "Giants" and "Meadowlands." Other portions 312-316 may include other terms, as shown in FIG. 3. In some embodiments, the portions may have the same lengths or different lengths.

The media application may calculate the path score of each portion 310-316 to the selected keyword and the secondary keywords. The path score may be calculated as described in relation to FIGS. 1 and 2. For example, portion 310 may be highly relevant to keywords "Sports" and "Football," and may be somewhat relevant to keyword "New York Giants," but may be irrelevant to keyword "Baseball." Other segments may have other path scores for each keyword, e.g., as shown in FIG. 3. A portion may be determined to be relevant to a keyword if the path score exceeds a certain threshold. Once the scores are computed, the media application may record all portions relevant to at least one of the keywords and refrain from recording portions not relevant to any keyword. In some embodiments, the media application generates a hierarchy based on the keywords, for example, as described in connection with FIG. 4.

In some embodiments, each of the portions 310, 312, 314, and 316 may be recorded by the media application (e.g., using a DVR of the user). In this embodiment, the user may request the media application to play only sections that are relevant to a particular keyword inputted by the user. For example, the user may request playback of all elements relevant to a keyword "New York Giants" or to a keyword "Football." In this implementation, the media application may perform the relevance analysis using the path scores as described above and sequentially playback only the portions that have path scores that match or exceed the threshold. For example, if the requested keyword was "New York Giants," the media application may playback segments 310 and 316 because they have scores (8 and 6) that exceed a threshold (e.g., a score of "5"). In another example, if the requested keyword was "football," the media application may playback segments 310, 312, and 316 because they all have a score of "10" that exceed a threshold (e.g., a score of "5"). In some embodiments, this technique may also be used to playback portions of several different programs that were recorded by the media application.

Figure 4:
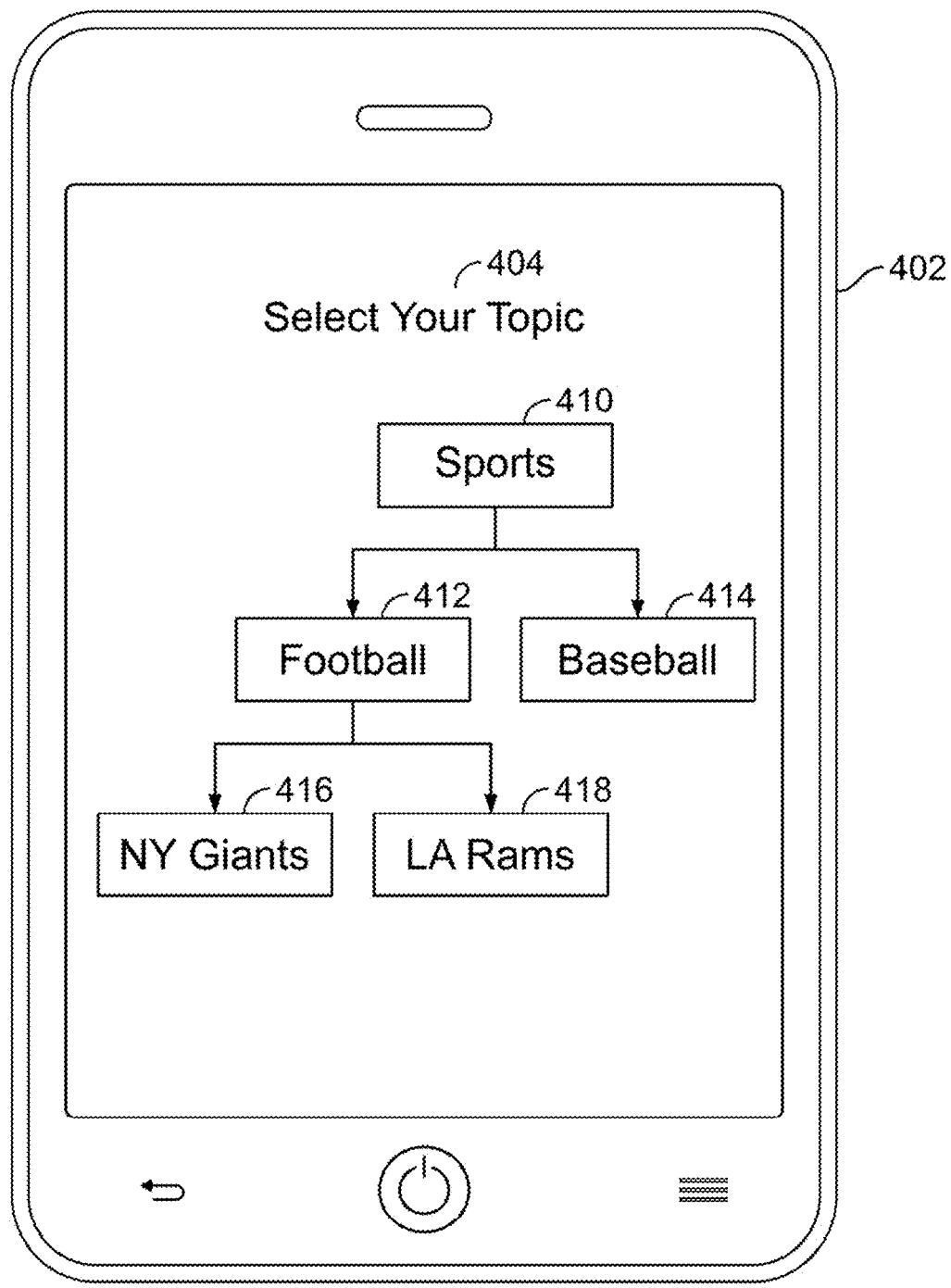
FIG. 4 shows an illustrative example user interface that includes a hierarchical menu for selection of a portion of a media asset for consumption, in accordance with some embodiments of the disclosure.

FIG. 4 shows an illustrative example user interface 404 of media device 402 that includes a hierarchical menu for selection of a portion of a media asset for consumption, in accordance with some embodiments of the disclosure. In some embodiments, media device 402 may be the same as device 302 and 106. In some embodiments, user interface displays a hierarchical menu of keywords identified in a way described in relation to FIG. 1 and FIG. 2. For example, user interface 404 may include a tree structure including keyword 410 ("Sports") and several secondary keywords 412-418 related to the keyword "Sports." For example, interface 404 may include a first level including keyword 412 "Football," and keyword 414 "Baseball." Interface 404 may also include a second level including keyword 416 "New York Giants" and keyword 418 "LA Rams."

In some embodiments, each of the keywords is associated with a related set of portions of the media asset (e.g., asset 304 of FIG. 3). For example, keyword "Sports" may be associated with portions 310-316, while the keyword "Football" may be associated with portions 310, 314 and 316. In another example, keyword "Baseball" may be associated with portion 314. In some embodiments, the media application receives a selection of keywords from menu 404. For example, a user may touch (e.g., using a touch screen) one of the keywords 410-418. In response, the media application plays only the portions associated with the selected keyword. For example, in response to receiving a selection of keyword 412, the media application may play back recorded portions 310, 314 and 316.

A media asset may be any electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same.

A media device may be any device for accessing the content described above, such as a television, a smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smart phone, or any other television equipment, computing equipment, or wireless device, and/or combination of the same.

Audio content data may be any kind of data indicative of audio of the media asset. For example, audio content data may refer to closed captioning data of the media asset. In another example, audio content data may refer to data acquired by performing speech-to-text transformation of speech from the media asset.

Figure 5:
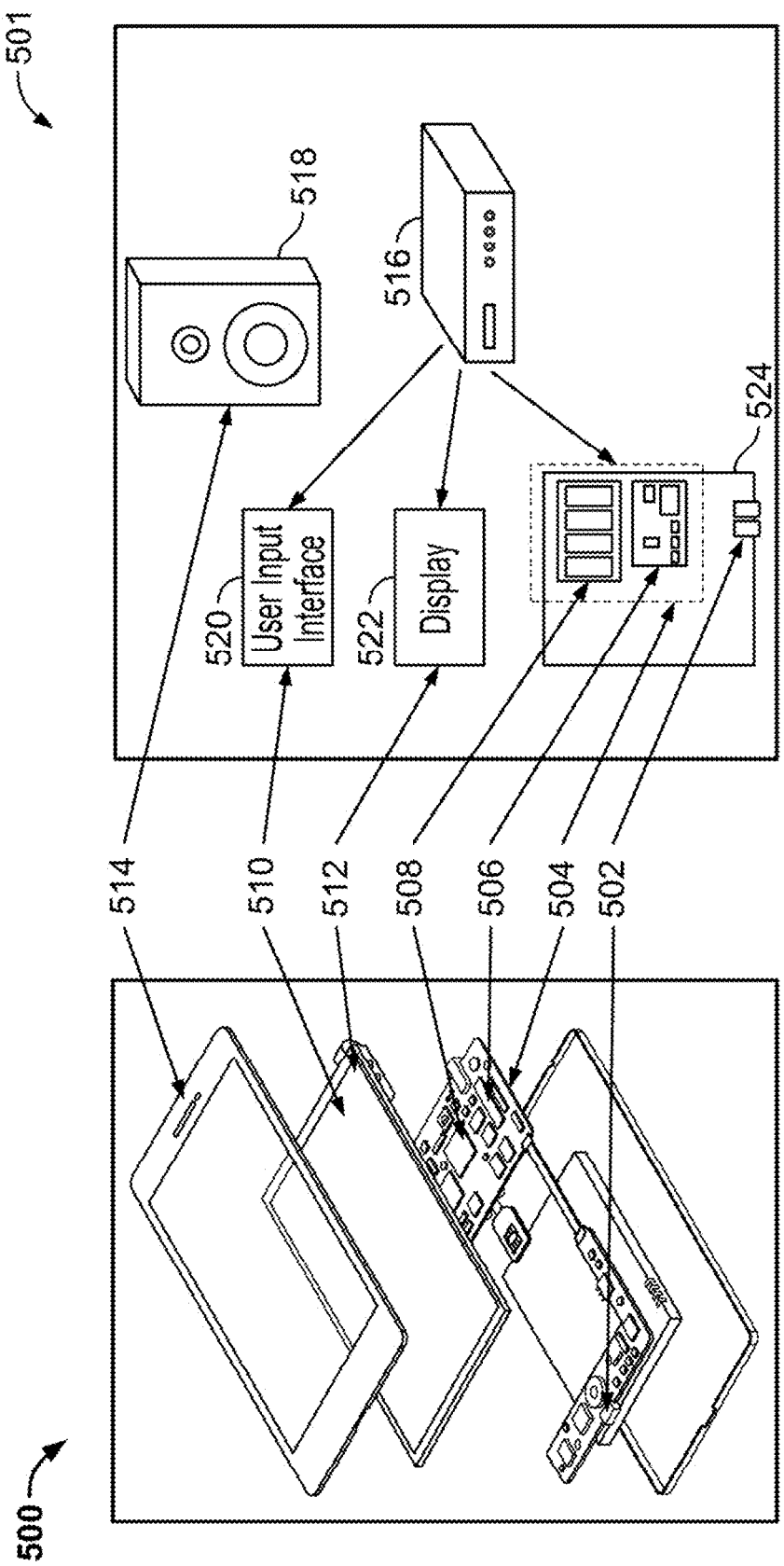
FIG. 5 is a diagram of an illustrative media system in accordance with some embodiments of the disclosure.

FIG. 5 shows a generalized embodiment of illustrative media devices 500 and 501. In some embodiments, media devices 500 and 501 may be the same as media device 106, 302, or 402. As depicted, media device 500 may be a smartphone or tablet, whereas media device 501 may be a home media system that includes equipment device 516 (e.g., a set-top box, CPU, video-game console, etc.) powered by processor 524. Media devices 500 and 501 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry, such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quadcore, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media application stored in memory (i.e., storage 508). Specifically, control circuitry 504 may be instructed by the media application to perform the functions discussed above and below.

In client-server-based embodiments, control circuitry 504 may include communications circuitry suitable for communicating with a media application server or other networks or servers. The instructions for carrying out the above-mentioned functionality may be stored on a server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of media devices, or communication of media devices in locations remote from each other.

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Non-volatile memory may also be used (e.g., to launch a boot-up routine and other instructions). Cloud-based storage, described in relation to FIG. 6, may be used to supplement storage 508 or instead of storage 508. In some embodiments, storage 508 may be used to store portions of the media asset that were determined to be relevant using techniques describes in relation to FIGS. 1-4.

Control circuitry 504 may include tuning circuitry, such as one or more analog tuners, one or more MP3 decoders or other digital decoding circuitry, or any other suitable tuning or audio circuits or combinations of such circuits. Encoding circuitry (e.g., for converting over-the-air, analog, or digital signals to audio signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the media device to receive and to display, to play, or to record content. The tuning and encoding circuitry may also be used to receive guidance data. The circuitry described herein, including for example, the tuning, audio generating, encoding, decoding, encrypting, decrypting, scaler, and analog/digital circuitry, may be implemented using software running on one or more general purpose or specialized processors. Multiple tuners may be provided to handle simultaneous tuning functions. If storage 508 is provided as a separate device from user equipment 500, the tuning and encoding circuitry (including multiple tuners) may be associated with storage 508.

A user may send instructions to control circuitry 504 using user input interface 510 of media device 500 or user input interface 520 of media device 501. User input interface 510 and user input interface 520 may be any suitable user interface, such as a remote control, mouse, trackball, keypad, keyboard, touchscreen, touchpad, stylus input, joystick, voice recognition interface, or other user input interfaces. Display 510 may be a touchscreen or touch-sensitive display. In such circumstances, user input interface 510 may be integrated with or combined with display 512. Display 522 may be provided as a stand-alone device or integrated with other elements of media device 501. Speakers 514 may be provided as integrated with other elements of media device 500. In the case of media device 501, speakers 518 may be stand-alone units (e.g., smart speakers). The audio component of videos and other content displayed on display 522 may be played through speakers 518. In some embodiments, the audio may be distributed to a receiver (not shown), which processes and outputs the audio via speakers 518.

The media application may be implemented using any suitable architecture. For example, it may be a stand-alone application wholly-implemented on media device 500. The media application and/or any instructions for performing any of the embodiments discussed herein may be encoded on computer readable media. Computer readable media includes any media capable of storing data. In some embodiments, the media application is a client-server-based application. Data for use by a thick or thin client implemented on media device 500 or media device 501 is retrieved on demand by issuing requests to a server remote from the media device 500 or media device 501, respectively. For example, media device 500 may receive inputs from the user via input interface 510 and transmit those inputs to the remote server for processing and generating the corresponding outputs. The generated output is then transmitted to media device 500 for presentation to the user.

Figure 6:
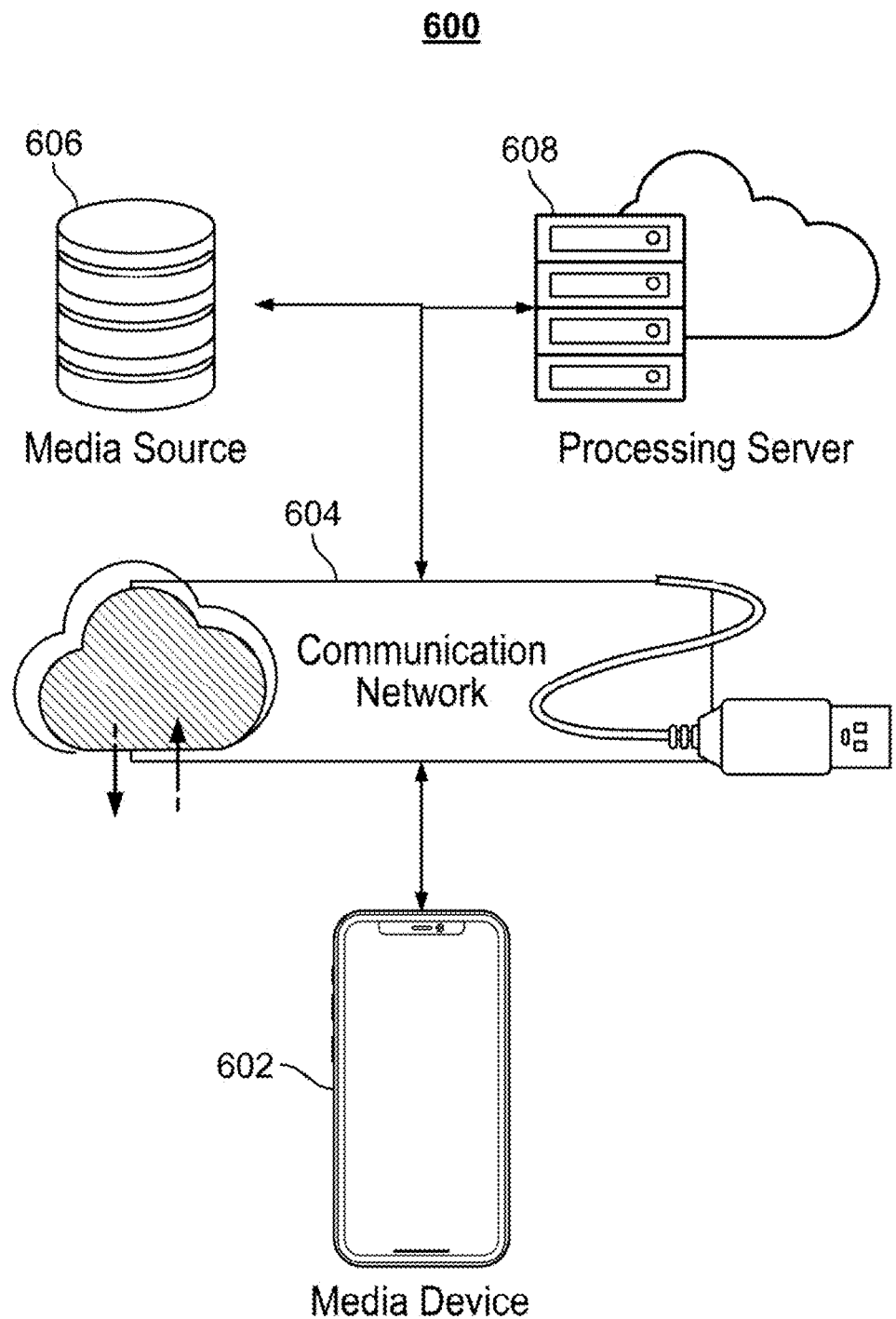
FIG. 6 is a diagram of an illustrative media device in accordance with some embodiments of the disclosure.

Media device 500 and media device 501 of FIG. 5 can be implemented in system 600 of FIG. 6 as media device 602. Media devices, on which a media application may be implemented, may function as stand-alone devices or may be part of a network of devices. Various network configurations of devices may be implemented and are discussed in more detail below.

In system 600, there may be multiple media devices, but only one of each is shown in FIG. 6 to avoid overcomplicating the drawing. In addition, each user may utilize more than one type of media device and also more than one of each type of media device.

Media device 602 may be coupled to communication network 604. Communication network 604 may be one or more networks including the Internet, a mobile phone network, mobile voice or data network (e.g., a 4G or LTE network), cable network, public switched telephone network, or other types of communications network or combinations of communications networks. Media source 606, processing server 608, and media device 602 may be connected to communication path 604 via one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths.

Although communications paths are not drawn between media device 602, media source 606 and processing server 608, these devices may communicate directly with each other via communication paths, such as short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The media devices may also communicate with each other directly through an indirect path via communication network 604.

System 600 includes media source 606 coupled to communication network 604. There may be more than one of media source 606, but only one is shown in FIG. 6 to avoid overcomplicating the drawing. Media source 606 may include one or more types of content distribution equipment including a television distribution facility, cable system headend, satellite distribution facility, programming sources (e.g., television broadcasters, etc.), intermediate distribution facilities and/or servers, Internet providers, on-demand media servers, and other content providers. Media source 606 may be the originator of content (e.g., a television broadcaster, a Webcast provider, etc.) or may not be the originator of content (e.g., an on-demand content provider, an Internet provider of content of broadcast programs for downloading, etc.). Media source 606 may include cable sources, satellite providers, on-demand providers, Internet providers, over-the-top content providers, or other providers of content. Media source 606 may also include a remote media server used to store different types of content (including video content selected by a user), in a location remote from any of the media devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety. Media source 606 may also provide metadata.

Media applications may be, for example, stand-alone applications implemented on media devices. For example, the media application may be implemented as software or a set of executable instructions which may be stored in storage 508, and executed by control circuitry 504 of a media device 602. In some embodiments, media applications may be client-server-based applications where only a client application resides on the media device, and a server application resides on processing server 608. For example, media applications may be implemented partially as a client application on control circuitry 504 of media device 602 and partially on processing server 608 as a server application running on control circuitry of processing server 608. When executed by control circuitry of processing server 608, the media application may instruct the control circuitry to generate the media application output (e.g., playback of stored portions of the media asset) and transmit the generated output to media device 602. The server application may instruct the control circuitry of the media source 606 to transmit metadata for storage on media device 602. The client application may instruct control circuitry of the receiving media device 602 to generate the media application output.

Media device 602 may operate in a cloud computing environment to access cloud services. In a cloud computing environment, various types of computing services for content sharing, storage or distribution are provided by a collection of network-accessible computing and storage resources, referred to as "the cloud." Cloud resources may be accessed by media device 602 using, for example, a web browser, a media application, a desktop application, a mobile application, and/or any combination of access applications of the same. Media device 602 may be a cloud client that relies on cloud computing for application delivery, or the media device may have some functionality without access to cloud resources. For example, some applications running on media device 602 may be cloud applications, i.e., applications delivered as a service over the Internet, while other applications may be stored and run on the media device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, media devices can use cloud resources for processing operations such as the processing operations performed by processing circuitry described in relation to FIG. 5.

Figure 7:
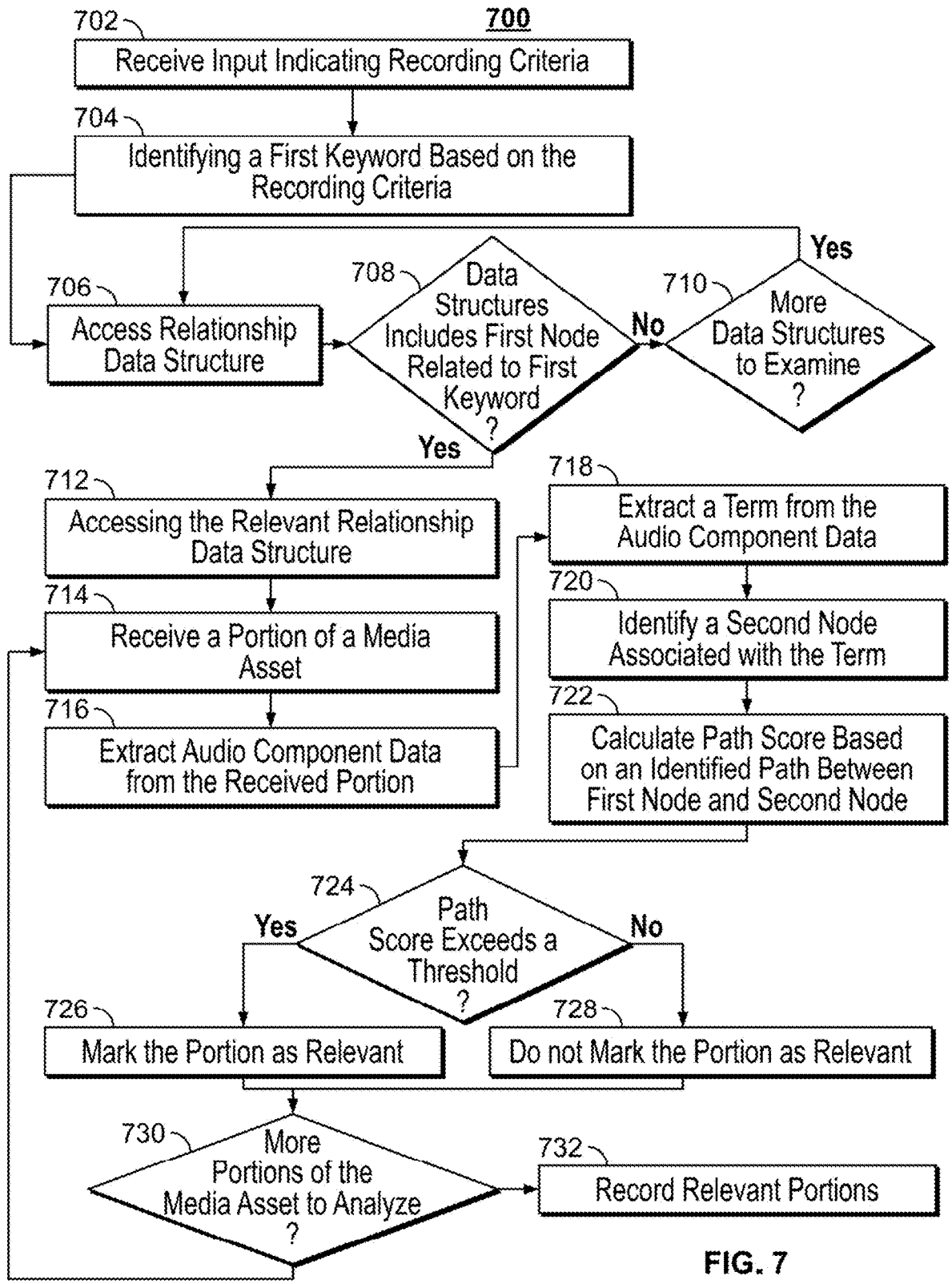
FIG. 7 is a flowchart of a detailed illustrative process recording relevant portions of a media asset, in accordance with some embodiments of the disclosure.

FIG. 7 is a flowchart of a detailed illustrative process 700 for recording relevant portions of a media asset, in accordance with some embodiments of the disclosure. Process 700 may be executed by control circuitry 504 (e.g., in a manner instructed to control circuitry 504 by the media application). Control circuitry 504 may be a part of the user's media device (e.g., media device 106, 302, or 402), or of a remote server separated from the user equipment by way of communications network 604.

At 702, control circuitry 504 receives user input indicating recording criteria. For example, user input may be received via user input interface 510. In one example, the user may directly request the type of data to be recorded, e.g., by providing voice or text input "record New York Giants news." In another example, the recording criteria may be extracted from the user profile that is stored locally (e.g., in storage 508) or remotely (e.g., on server 608).

At 704, control circuitry 504 may identify a first keyword based on the recording criteria. For example, a key noun may be extracted from the user's input (e.g., keyword "New York Giants" may be extracted from criterion "record New York Giants news.") In another example, the keyword "New York Giants" may be extracted from user preferences of the user.

Control circuitry 504 may search a database for a relevant data structure (e.g., data structure 200). At 706, control circuitry 504 accesses one of the data structures in the database (e.g., database stored on server 608). At 708, control circuitry 504 searches the data structure accessed at 706 and checks if it includes a node related to the first keyword. If the such a node is found, e.g., if control circuitry 504 finds node 210 (New York Giants) that matches the keyword "New York Giants," process 700 may proceed to step 712. Otherwise, process 700 proceeds to step 710. At 710, control circuitry 504 checks if more data structures are left to examine. If there any additional data structures, process 700 proceeds to step 706 and examines a next data structure. Otherwise, process 700 ends. In some embodiments, steps 706-710 may be optional, and control circuitry 504 may proceed to step 712 directly after step 704 (for example, if there is only one data structure that can be accessed).

At 712, control circuitry 504 accesses the relevant data structure identified at step 708 that includes a first node that corresponds to the first keyword from step 704. For example, control circuitry 504 may copy the relevant data structure to random access memory for faster operations.

At 714, control circuitry 504 may receive a portion of the media asset. For example, control circuitry 504 may receive a part of the media asset over network 604 from media source 606. In some embodiments, control circuitry 504 receives a scene of a news shows from a video service 606 or from a broadcast source 606.

At 716, control circuitry 504 may extract audio component data from the portion of the media asset. For example, control circuitry 504 may extract closed captioning text from the portion of the media asset. In another example, control circuitry 504 may process voice data from the portion of the media asset with speech-to-text processing to acquire text that can serve as audio component data. Exemplary audio component data for a portion of the media asset is shown in FIG. 3, with relation to portions 310, 312, 314, and 316.

At 718, control circuitry 504 may extract a term from the audio component data. For example, if the audio component data includes the terms "Abby McGrew," "Giants," and "Meadowlands," control circuitry 504 may extract the term "Abby McGrew." At 720, control circuitry 504 may identify a second node in a data structure (e.g., data structure 200) that is associated with the extracted term. For example, node 208 may be identified as the second node because it is labeled "Abby McGrew."

At 722, control circuitry 504 may calculate a path score for the portion of the media asset based on a path between first node (e.g., node 210) and second node (e.g., node 208). In one implementation, the score is based on the size of the path between the nodes. For example, the path size may be computed as the distance between nodes 210 and 208 ("2"), or the sum of the weights in the paths between modes 210 and 208 ("13"). The path score may be determined to be inversely proportional to the size of the paths. For example, a paths size of 2 may result in a score of "1/2," while the score "13" may result in a score of "1/13." In some embodiments, step 718 may be repeated for each term in the audio component data. In that case the final path scores may computed as an average or sum of all path scores computed for each term.

At 724, control circuitry 504 may check if the path score exceeds a threshold. If the threshold is exceeded, process 700 may proceed to 726; otherwise, process 700 may proceed to 728. At 726, control circuitry 504 may mark the portion of the media asset as relevant to the extracted keyword. Optionally, at step 728, control circuitry 504 may mark the portion of the media asset as irrelevant to the extracted keyword. In some embodiments, steps 726-732 may be optional. Instead, control circuitry 504 may immediately record the portion of the media asset when it's found to be relevant.

At 730, control circuitry 504 may check if all portions of the media asset were analyzed. If so, process 700 proceeds to 732, otherwise, process 700 returns to 714 and analyzes a next portion of the media asset. For example, portions 310-316 may each be sequentially analyzed in this manner.

At 732, control circuitry 504 may store or record all portions of the media asset that were found relevant for the extracted keyword at step 704. For example, control circuitry 504 may store the portions in memory 608. In some embodiments, the portions are stored on remote server 408. In some embodiments, the portions are stored on DVR equipment of media device 601. In one implementation, the user is then able to request for viewing only the relevant portions of the media asset.

Figure 8:
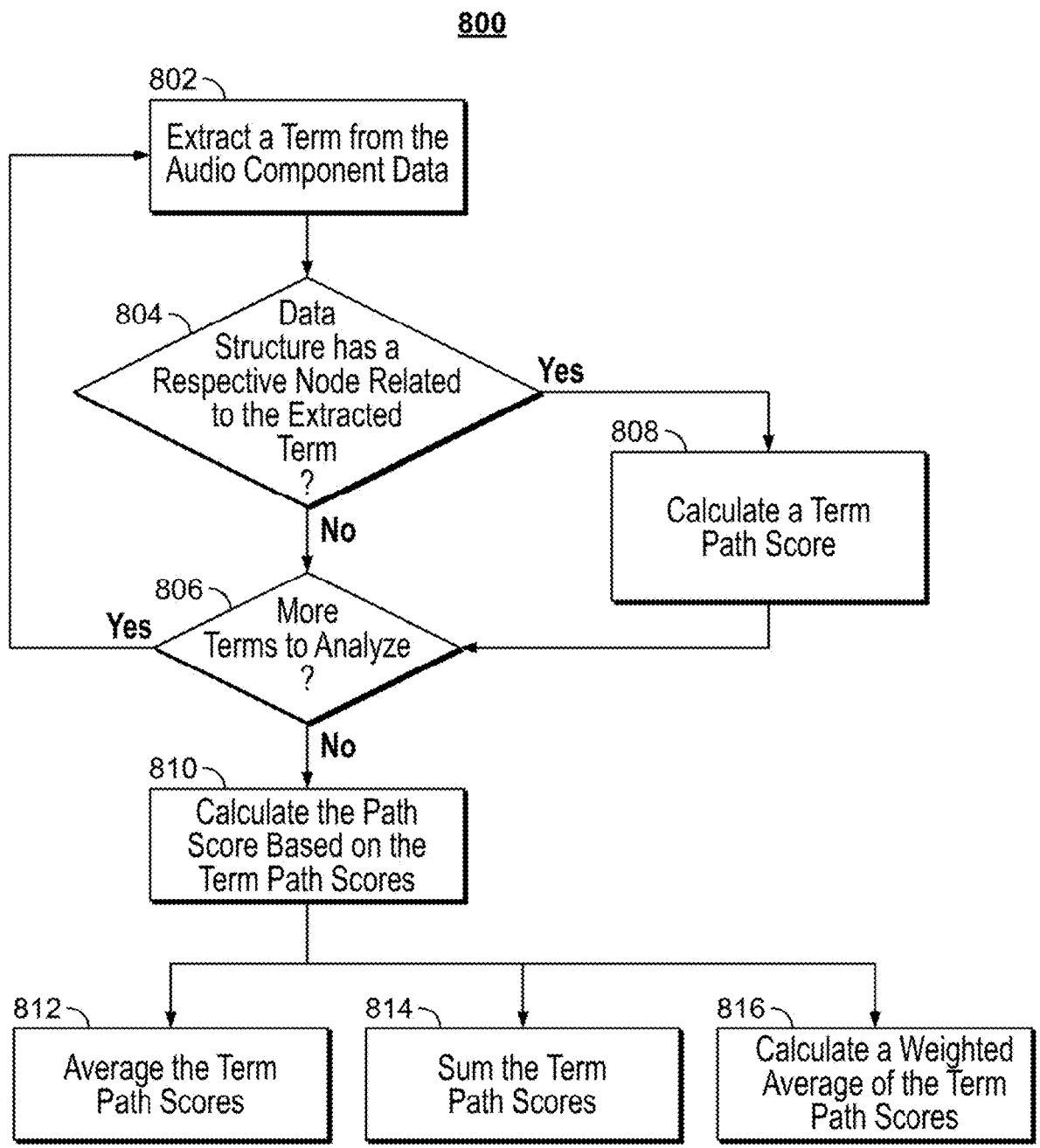
FIG. 8 is a flowchart of an illustrative process for calculating a path score of a portion of a media asset to a keyword, in accordance with some embodiments of the disclosure.

FIG. 8 is a flowchart of a detailed illustrative process 800 for calculating a path score of a portion of a media asset to a keyword, in accordance with some embodiments of the disclosure. Process 800 may be executed by control circuitry 504 (e.g., in a manner instructed to control circuitry 504 by the media application). Control circuitry 504 may be a part of the user's media device (e.g., media device 106, 302, or 402), or of a remote server separated from the user equipment by way of communications network 604. In some embodiments, process 800 is performed as part of step 722 of FIG. 7. For example, process 800 may be performed to analyze all terms of audio content data extracted in step 716, to arrive at a final path score.

At 802, control circuitry 504 may extract a term from the audio content data. For example, control circuitry 504 may sequentially extract terms from the audio content data. In some embodiments, control circuitry 504 may extract only nouns or noun phrases, using a grammatical reference database.

At 804, control circuitry 504 may traverse the data structure (e.g., data structure 200) to determine if it contains a second node corresponding to the extracted term in addition to the node corresponding to the keyword (e.g., a keyword from step 704). If such a node is found, control circuitry 504 may proceed 808. Otherwise, process 800 may continue at 806.

At 808, control circuitry 504 may calculate a term path score. For example, the term path score may be computed based on the size of the path between the first and second nodes, e.g., as described in step 722.

At 806, control circuitry 504 may check if more terms remain to be analyzed in the audio component data. If so, process 800 may return to 802 and repeat the process 802-806 for the next term. Otherwise, process 800 proceeds to 810.

At 810, control circuitry 504 may calculate the overall path score for the portion of the media asset. In some embodiments, the coalition may be performed using any one of steps 812, 814, at 816. At 812, the term path scores acquired in step 808 may be averaged together. At 816, the term path scores acquired in step 808 may be summed together. At 816, the term path scores acquired in step 808 may be averaged together after being weighted. For example, some terms may have more weight than other terms. In one example, terms that match a list of terms in the profile of the user may have more weight.

Figure 9:
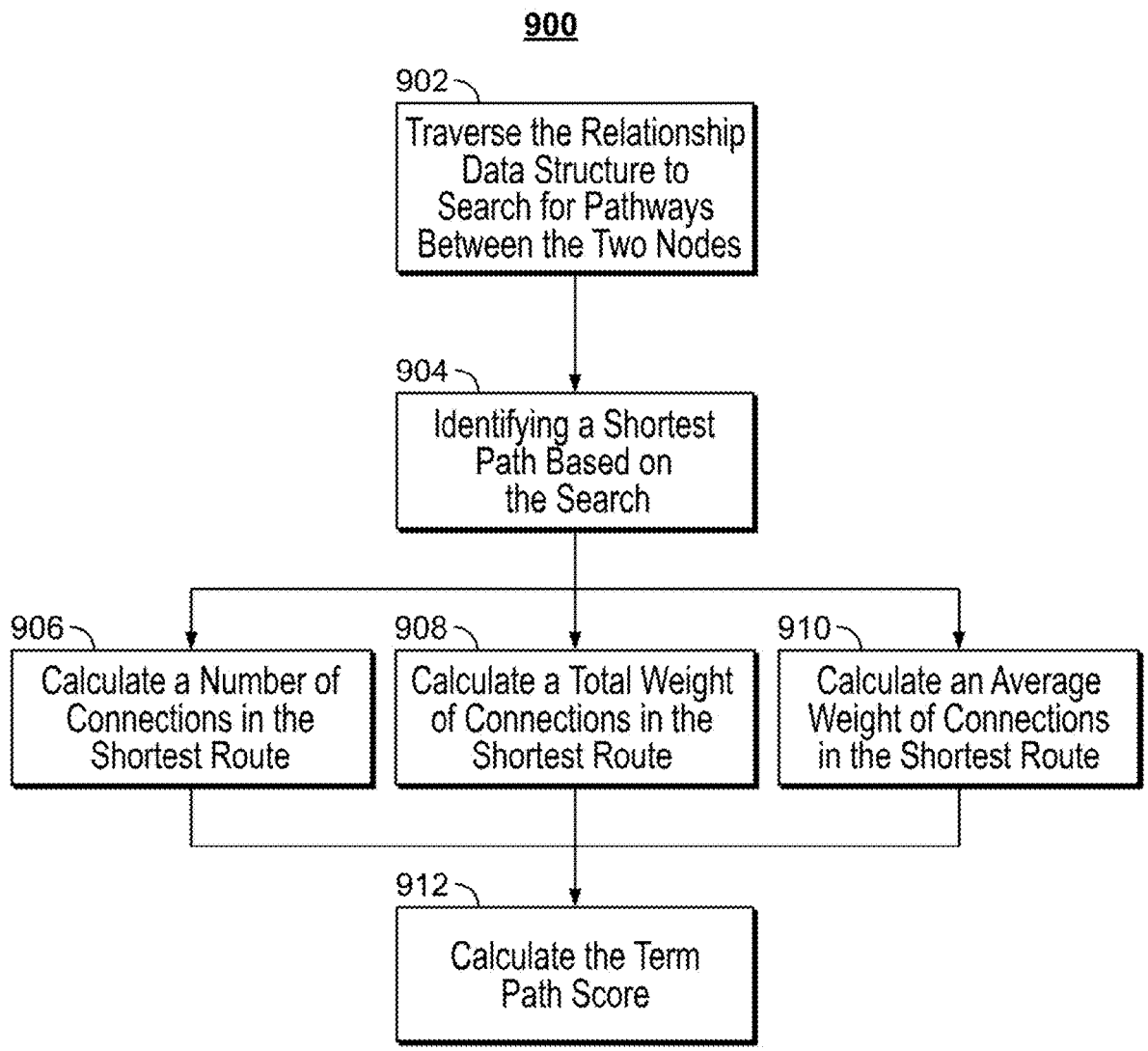
FIG. 9 is a flowchart of another illustrative process for calculating a path score of a portion of a media asset to a keyword, in accordance with some embodiments of the disclosure.

FIG. 9 is a flowchart of a detailed illustrative process 900 for calculating a path score of a portion of a media asset to a keyword, in accordance with some embodiments of the disclosure. Process 900 may be executed by control circuitry 504 (e.g., in a manner instructed to control circuitry 504 by the media application). Control circuitry 504 may be a part of the user's media device (e.g., media device 106, 302, or 402), or of a remote server separated from the user equipment by way of communications network 604. In some embodiments, process 900 is performed as part of step 722 of FIG. 7. For example, process 900 may be performed to analyze all terms of audio content data extracted in step 716, to arrive at a final path score. In some embodiments, process 900 may be used to determine a path score based on any two nodes of a data structure (e.g., data structure 200).

At 902, control circuitry 504 may traverse the data structure (e.g., data structure 200) to search for pathways between two nodes (e.g., first node and second node). Any graph traversal technique may be used. For example, control circuitry 504 may use a breadth-first search or depth-first search to identify pathways. For example, when searching for a path size between two remote nodes 210 and 208 of FIG. 2, control circuitry 504 may identify path 210-206-208 and path 220-212-218-220-216-206-208.

At 904, control circuitry 504 may select the shortest path. In some embodiments, a path with the least number of hops is picked. For example, because path 210-206-208 only has two hops as opposed to 6 hops in path 220-212-218-220-216-206-208, it is selected as the shorter path.

Next, control circuitry 504 may identify the size of the path using one of steps 906, 908, or 910. At 906, control circuitry 504 may count the number of hops in the shorter path. At 908, control circuitry 504 may sum the weights of all connections in the shortest path. At 910, control circuitry 504 may calculate an average of the weights of all connections in the shortest path.

At 912, control circuitry 504 may compute the path score based on the shortest path size. For example, control circuitry 504 may set the path score to be inversely proportional to the path size. In some embodiments, a reciprocal operation is used to compute the path score. That is, a path size of "2" may result in a path score "1/2." In some embodiments, longer paths indicate less relevance, while shorter paths indicate more relevance.

Figure 10:
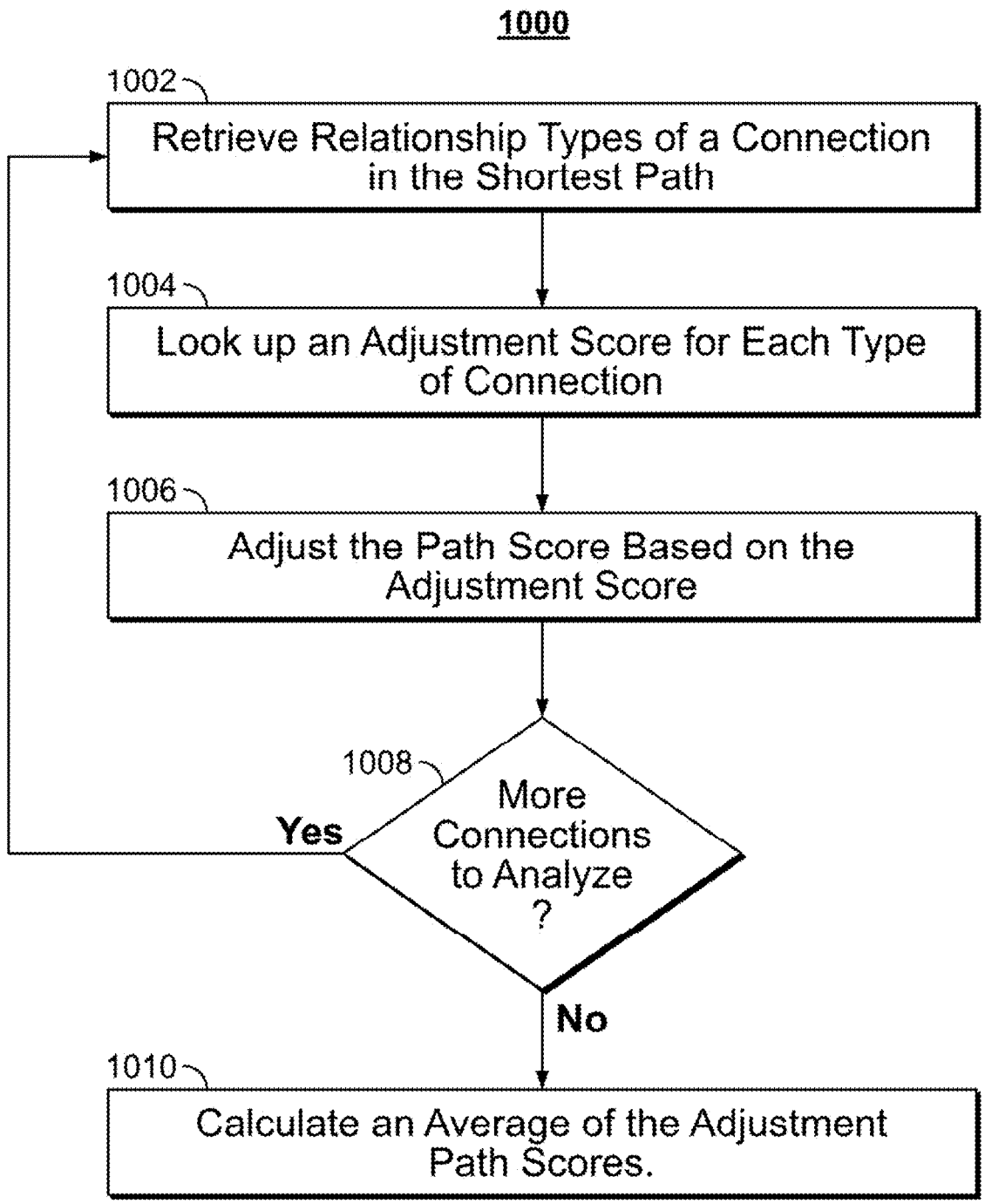
FIG. 10 is a flowchart of yet another illustrative process for calculating a path score of a portion of a media asset to a keyword, in accordance with some embodiments of the disclosure.

FIG. 10 is a flowchart of a detailed illustrative process 1000 for calculating a path score of a portion of a media asset to a keyword, in accordance with some embodiments of the disclosure. Process 1000 may be executed by control circuitry 504 (e.g., in a manner instructed to control circuitry 504 by the media application). Control circuitry 504 may be a part of the user's media device (e.g., media device 106, 302, or 402), or of a remote server separated from the user equipment by way of communications network 604. In some embodiments, process 1000 is performed as part of step 912 of FIG. 9. For example, process 1000 may be used to further adjust the path score based on the size of the path between two nodes.

At 1002, control circuitry 504 may retrieve a type of connection for one of the connections in the shortest path (e.g., as identified at step 904) between two nodes. For example, the connection between nodes 204 and 210 may have a label ("team-sport" relationship). In another example, the connection between nodes 206 and 208 may have a label ("family" relationship). In another example, the connection between nodes 210 and 206 may have a label ("organization-employee" relationship).

At 1004, control circuitry 504 may look up an adjustment score for the weights based on the relationship type. For example, in a sports context, an organization-employee relationship may have a higher weight than a family relationship.

At 1006, control circuitry 504 may adjust the weight of the connection based on the adjustment score from step 1004. For example, control circuitry 504 may increase the weight of a connection between node 210 and node 206, because a team-sport relationship matters more in a sports context than other types of connections.

At 1008, control circuitry 504 may check if more connections remain in the shortest path. If so, control circuitry 504 may proceed back to step 1002 and repeat steps 1002-1008 for the next connection in the shortest path.

At 1010, control circuitry 504 may calculate and adjust the path score. For example, control circuitry 504 may perform one of steps 908 or 910 using adjusted weight scores instead of regular weight scores. The adjusted path score may be used as the path score in step 724.

Figure 11:
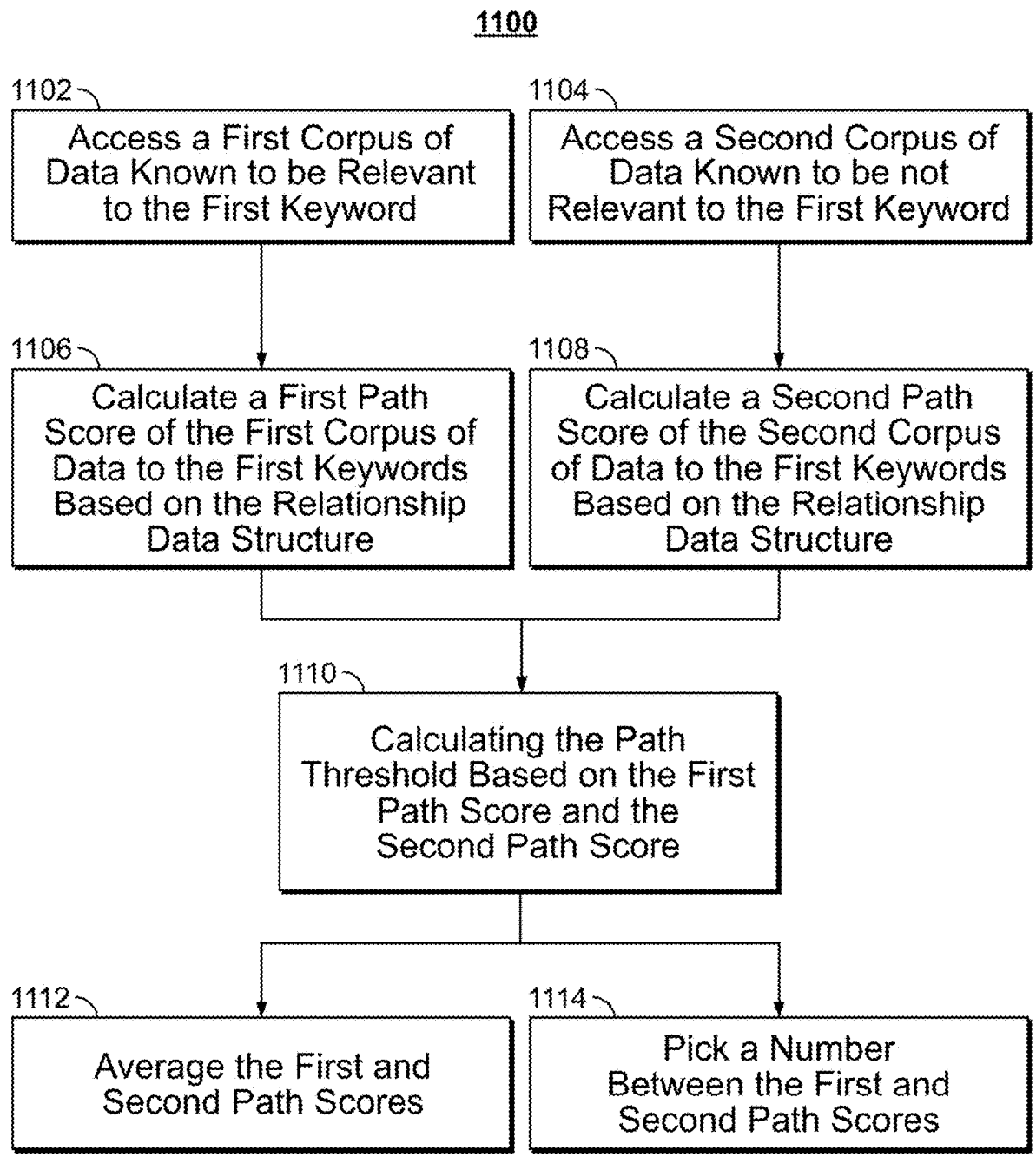
FIG. 11 is a flowchart of an illustrative process for selecting a path threshold for a portion of a media asset, in accordance with some embodiments of the disclosure.

FIG. 11 is a flowchart of a detailed illustrative process 1100 for selecting a path threshold for identifying relevance of a portion of a media asset, in accordance with some embodiments of the disclosure. Process 1100 may be executed by control circuitry 504 (e.g., in a manner instructed to control circuitry 504 by the media application). Control circuitry 504 may be a part of the user's media device (e.g., media device 106, 302, or 402), or of a remote server separated from the user equipment by way of communications network 604. In some embodiments, process 1100 is performed as part of step 724 of FIG. 7. For example, process 100 may be used to set the threshold that is used in step 724.

At 1102, control circuitry 504 may access a first corpus of data known to be relevant to the first keyword (e.g., keyword of step 704). For example, control circuitry 504 may access transcripts of sports shows.

At 1106, control circuitry 504 may compute a first path score for the first corpus of data using the data structure (e.g., data structure 200). For example, the path score may be calculated in the same way the path score for extracted audio content data is calculated in FIG. 7.

At 1104, control circuitry 504 may access a second corpus of data known to be irrelevant to the first keyword (e.g., keyword of step 704). For example, control circuitry 504 may access transcripts of political shows.

At 1108, control circuitry 504 may compute a second path score for the second corpus of data using the data structure (e.g., data structure 200). For example, the path score may be calculated in the same way as the path score for extracted audio content data is calculated in FIG. 7.

At 1110, control circuitry 504 may calculate the threshold based on the first and second path scores of the first and second corpus. In some embodiments, control circuitry 504 may use either step 1112 or step 1114 to calculate the path threshold. For example, at 1112, control circuitry 504 may average the first and second path scores. At 1114, control circuitry 504 may pick a number (e.g., at random) between the first and second path scores. In this way, control circuitry 504 may determine what kinds of path scores indicate a relevance, and what kinds of path scores indicate irrelevance.

Figure 12:
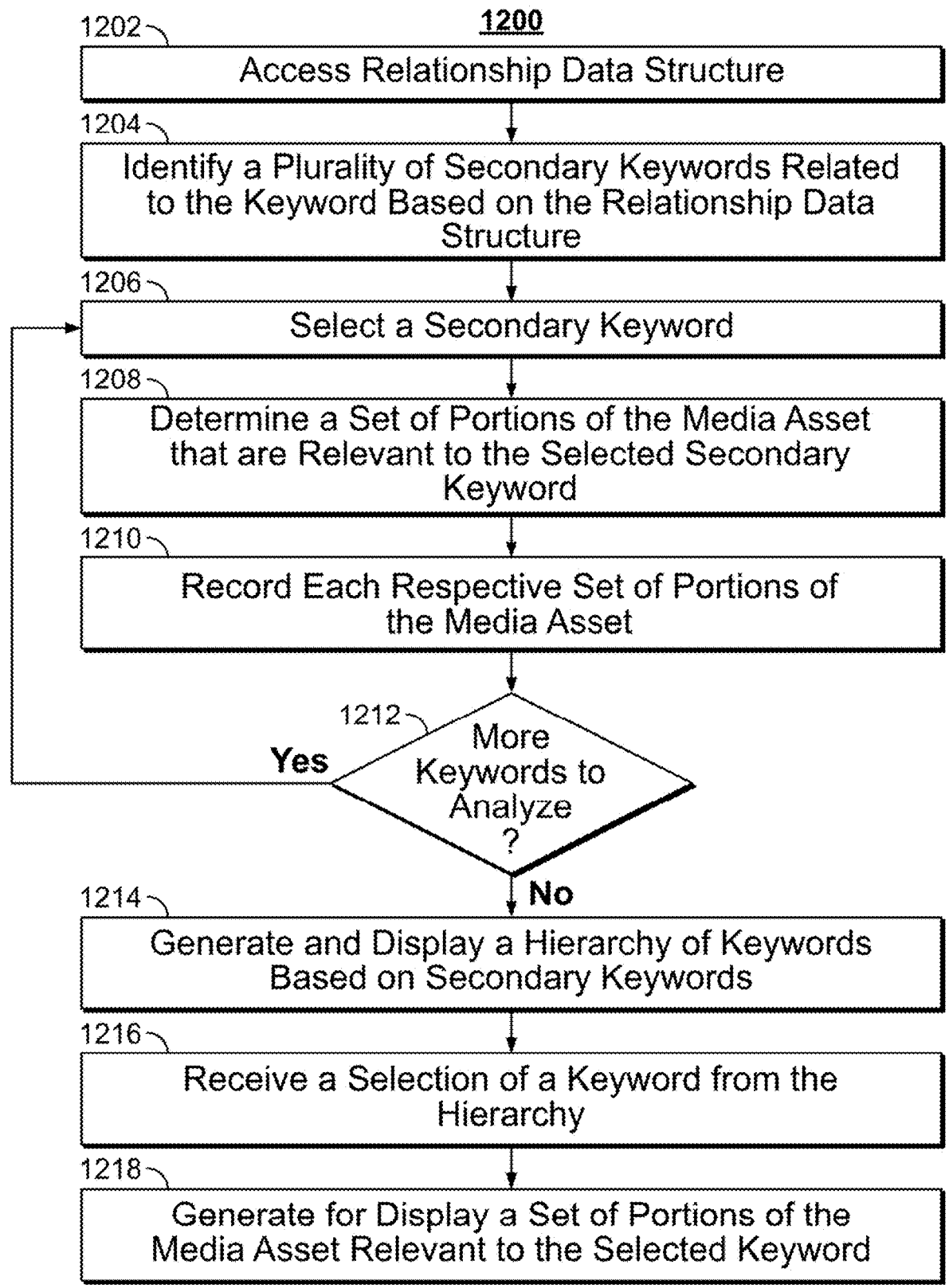
FIG. 12 is a flowchart of an illustrative process for generating a hierarchy of keywords, in accordance with some embodiments of the disclosure.

FIG. 12 is a flowchart of a detailed illustrative process 1200 for generating a hierarchy of keywords, in accordance with some embodiments of the disclosure. Process 1200 may be executed by control circuitry 504 (e.g., in a manner instructed to control circuitry 504 by the media application). Control circuitry 504 may be a part of the user's media device (e.g., media device 106, 302, or 402), or of a remote server separated from the user equipment by way of communications network 604. In some embodiments, control circuitry 504 may perform process 1200 as part of process 700.

For example, step 1202 may be performed after step 712, at which a first keyword is identified. At 1202, control circuitry 504 may access the same relationship data structure that is used in step 712. At 1204, control circuitry 504 may identify a popularity of secondary keywords based on the data structure. For example, for the keyword "New York Giants," control circuitry 504 may identify secondary keywords "Eli Manning" and "NFL," due to the proximity of nodes 204 and 206 to node 210.

At 1206, control circuitry 504 may select one of the secondary keywords. For example, the keyword "Eli Manning" may be selected. At 1208, control circuitry 504 may identify a subset of portions of the media asset that are relevant to the keyword "Eli Manning" For example, control circuitry 504 may use the same process as described for the identified subset of portions of the media asset that are relevant to the first keyword (e.g., using steps 712-732). At 1210, the identified subset of the portions of the media asset may be recorded (e.g., on storage 608).

At 1212, control circuitry 504 may determine whether more secondary keywords may be analyzed. If so, process 1200 returns to 1206 and repeats steps 1206-1212 for the next keyword (e.g., for keyword "NFL"). If not, process 1200 goes on to step 1214.

At 1214, control circuitry 504 generates and displays a hierarchy of keywords (e.g., keywords "New York Giants," "NFL," and "Eli Manning"). In some embodiments, control circuitry 504 determines that all segments relevant to "New York Giants" are relevant to "NFL," but not all segments relevant to "NFL" are relevant to "New York Giants." In this case, the keyword "NFL" is placed higher in the hierarchy than the keyword "New York Giants." The hierarchy may be screen on the screen of the media device (e.g., display 622). An exemplary hierarchy is shown in FIG. 4.

At 1216, control circuitry 504 may receive a selection of a keyword from the hierarchy. For example, control circuitry 504 may determine a key press via user interface 620. In response, control circuitry 504 may proceed to step 1218. At 1218, control circuitry 504 may generate for display only the subset of portions relevant to the selected keyword. For example, if the keyword "New York Giants" is selected on interface 620, control circuitry 504 may generate for display portions 310 and 316 of the news program 304.

Figure 13:
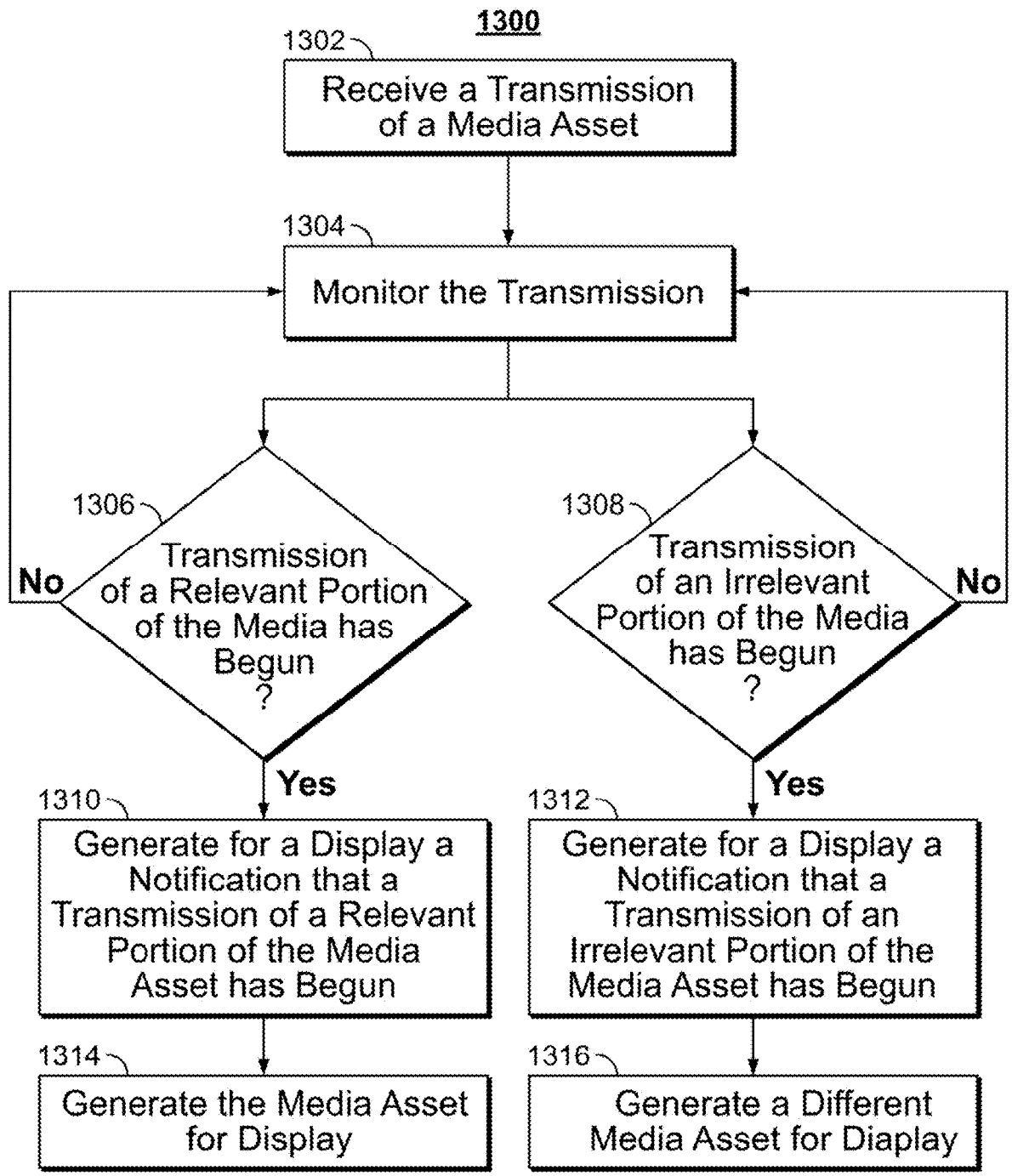
FIG. 13 is a flowchart of an illustrative process for generating notification regarding relevant portions of a media asset, in accordance with some embodiments of the disclosure.

FIG. 13 is a flowchart of a detailed illustrative process 1300 for generating notification regarding relevant portions of a media asset, in accordance with some embodiments of the disclosure. Process 1300 may be executed by control circuitry 504 (e.g., in a manner instructed to control circuitry 504 by the media application). Control circuitry 504 may be a part of the user's media device (e.g., media device 106, 302, or 402), or of a remote server separated from the user equipment by way of communications network 604. In some embodiments, control circuitry 504 may perform process 1300 after process 700 is performed or parallel to process 700.

At 1302, control circuitry 504 may receive a transmission of a media asset, e.g., over network 604 from media source 606. At 1304, control circuitry 504 may monitor the transmission to identify transmission of the relevant portions. For example, the relevance of a portion of the media asset may be determined as described in FIG. 7 (e.g., via calculation of path scores).

At 1306, control circuitry 504 may check if transmission of a relevant portion has begun or is about to begin. For example, if the recording criteria (e.g., those recited at step 702) include the keyword "Football," control circuitry 504 may determine that transmission of the relevant portions has begun when portion 310; starts being transmitted (e.g., at time stamp 0:00). If so, control circuitry 504 proceeds to 1310, otherwise, monitoring continues at 1304.

At 1310, control circuitry 504 may generate for display a notification that a relevant portion is being transmitted to alert the user. For example, control circuitry 504 may generate a message "Football News is on now!" on display 322. At 1314, the control circuitry 504 may automatically generate the media asset for display, e.g., by automatically tuning to a channel showing the media asset. In some embodiments, at step 1312, control circuitry 504 may prompt the user to initiate recording in addition or instead of generating the message. In this example, at 1314, if the user responds affirmatively to the prompt (e.g., by pressing a "yes" button), control circuitry 504 may record a portion of the media asset instead of or in addition to generating the media asset for display.

At 1308, control circuitry 504 may check if transmission of an irrelevant portion has begun or is about to begin. For example, if the recording criteria (e.g., those recited at step 702) include the keyword "Football," control circuitry 504 may determine that transmission of an irrelevant portion has begun when portion 314 starts being transmitted (e.g., at time stamp 3:00). If so, control circuitry 504 proceeds to 1312; otherwise, monitoring continues at 1304.

At 1312, to alert the user, control circuitry 504 may generate for display a notification that a relevant portion is no longer being transmitted. For example, control circuitry 504 may generate a message "Football News is over" on display 322. At 1316, the control circuitry 504 may automatically generate a different media asset for display, for example by automatically tuning away from the channel showing the media asset. In some embodiments, control circuitry 504 may automatically stop recording the media asset when it is determined that the relevant portion is no longer being transmitted. In some embodiments, the automatically stop may be performed in addition to or instead of generating the message and generating a different media asset for display.

It should be noted that processes 700-1300 or any step thereof could be performed on, or provided by, any of the devices shown in FIGS. 5-6. For example, the processes may be executed by control circuitry 504 (FIG. 5) as instructed by a notification delivery application implemented on media device 602 and/or processing server 608. In addition, one or more steps of a process may be incorporated into or combined with one or more steps of any other process or embodiment (e.g., steps from process 700 may be combined with steps from process 1300). In addition, the steps and descriptions described in relation to FIGS. 7-13 may be done in alternative orders or in parallel to further the purposes of this disclosure. For example, each of these steps may be performed in any order or in parallel or substantially simultaneously to reduce lag or increase the speed of the system or method.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for recording portions of a media asset relevant to recording criteria, the method comprising:
   receiving input indicating the recording criteria for identifying one or more portions of the media asset to be recorded;
   identifying a keyword based on the recording criteria;
   determining a relatedness indicating a similarity between the keyword and a term associated with a portion of the media asset; and
   in response to determining that the determined relatedness exceeds a relatedness threshold, recording the portion of the media asset,
   wherein the determining the relatedness between the keyword and the term associated with the portion of the media asset comprises:
      accessing a data structure to identify a first node associated with the keyword, wherein the data structure comprises the first node and a plurality of nodes connected to the first node via a plurality of paths;
      identifying a second node in the data structure that is associated with the term associated with the portion of the media asset; and
      calculating the relatedness between the keyword and the term associated with the portion of the media asset based on a path size in the data structure between the first node and the second node;
   the method further comprising:
      accessing a first corpus of data known to be relevant to the keyword;
      calculating a first relatedness of the first corpus of data to the keyword based on the data structure;
      accessing a second corpus of data known to be not relevant to the keyword;
      calculating a second relatedness of the second corpus of data to the keyword based on the data structure; and
      calculating the relatedness threshold based on the first relatedness and the second relatedness.

2. The method of claim 1, further comprising:
   retrieving data associated with the portion of the media asset; and
   extracting the term associated with the portion of the media asset from the retrieved data.

3. The method of claim 2, wherein the retrieved data corresponds to audio associated with the portion of the media asset.

4. The method of claim 1, further comprising calculating the path size between the first node and the second node, wherein calculating the path size comprises:
   identifying a shortest path between the first node and the second node in the data structure; and
   performing at least one of:
      calculating a number of connections in the shortest path;
      calculating a total weight of connections in the shortest path; and
      calculating an average weight of connections in the shortest path.

5. The method of claim 4, wherein calculating the total weight of connections in the shortest path comprises:
   retrieving a type for each connection in the shortest path between the first node and the second node;
   adjusting a weight of each connection based on the respective retrieved type; and
   calculating the total weight of adjusted connections.

6. The method of claim 1, wherein the keyword is a first keyword, and
   wherein the method further comprises:
      identifying a set of portions of the media asset relevant to the first keyword based on the data structure;
      recording the set of portions of the media asset relevant to the first keyword;
      identifying a plurality of secondary keywords related to the first keyword;
      for each respective secondary keyword, determining a respective set of portions of the media asset;
      recording each respective set of portions of the media asset;
      generating a hierarchy of keywords based on the first keyword and the plurality of secondary keywords; and
      in response to a selection of a selected keyword from the hierarchy, generating for display a set of portions of the media asset relevant to the selected keyword.

7. The method of claim 6, further comprising:
   monitoring a transmission of the media asset; and
   in response to determining that a transmission of a portion of the media asset that belongs to the set of portions of the media asset relevant to the first keyword has begun:
      generating for a display a notification that the transmission of a relevant portion of the media asset has begun.

8. The method of claim 1, wherein receiving the input indicating recording criteria comprises receiving the keyword from a user or extracting a term from preference data of the user.

9. A system for recording portions of a media asset relevant to recording criteria, the system comprising:
   input circuitry configured to:
      receive input indicating the recording criteria for identifying one or more portions of the media asset to be recorded; and
   control circuitry configured to:
      identify a keyword based on the recording criteria;
      determine a relatedness indicating a similarity between the keyword and a term associated with a portion of the media asset; and
      in response to determining that the determined relatedness exceeds a relatedness threshold, record the portion of the media asset,
   wherein, when determining the relatedness between the keyword and the term associated with the portion of the media asset, the control circuitry is further configured to:
      access a data structure to identify a first node associated with the keyword, wherein the data structure comprises the first node and a plurality of nodes connected to the first node via a plurality of paths;
      identify a second node in the data structure that is associated with the term associated with the portion of the media asset; and
      calculate the relatedness between the keyword and the term associated with the portion of the media asset based on a path size in the data structure between the first node and the second node; and
   wherein the control circuitry is further configured to:
      access a first corpus of data known to be relevant to the keyword;

calculate a first relatedness of the first corpus of data to the keyword based on the data structure;
access a second corpus of data known to be not relevant to the keyword;
calculate a second relatedness of the second corpus of data to the keyword based on the data structure; and
calculate the relatedness threshold based on the first relatedness and the second relatedness.

10. The system of claim 9, wherein the control circuitry is further configured to:
retrieve data associated with the portion of the media asset; and
extract the term associated with the portion of the media asset from the retrieved data.

11. The system of claim 10, wherein the retrieved data corresponds to audio associated with the portion of the media asset.

12. The system of claim 9, wherein the control circuitry is further configured to calculate the path size between the first node and the second node, and
wherein, when calculating the path size, the control circuitry is further configured to:
identify a shortest path between the first node and the second node in the data structure; and
perform at least one of:
calculating a number of connections in the shortest path;
calculating a total weight of connections in the shortest path; and
calculating an average weight of connections in the shortest path.

13. The system of claim 12, wherein, when calculating the total weight of connections in the shortest path, the control circuitry is further configured to:
retrieve a type for each connection in the shortest path between the first node and the second node;
adjust a weight of each connection based on the respective retrieved type; and
calculate the total weight of adjusted connections.

14. The system of claim 9, wherein the keyword is a first keyword, and
wherein the control circuitry is further configured to:
identify a set of portions of the media asset relevant to the first keyword based on the data structure;
record the set of portions of the media asset relevant to the first keyword;
identify a plurality of secondary keywords related to the first keyword;
for each respective secondary keyword, determine a respective set of portions of the media asset;
record each respective set of portions of the media asset;
generate a hierarchy of keywords based on the first keyword and the plurality of secondary keywords; and
in response to a selection of a selected keyword from the hierarchy, generate for display a set of portions of the media asset relevant to the selected keyword.

15. The system of claim 14, wherein the control circuitry is further configured to:
monitor a transmission of the media asset; and
in response to determining that a transmission of a portion of the media asset that belongs to the set of portions of the media asset relevant to the first keyword has begun:
generate for a display a notification that the transmission of a relevant portion of the media asset has begun.

16. The system of claim 9, wherein, when receiving the input indicating recording criteria, the control circuitry is further configured to receive the keyword from a user or extract a term from preference data of the user.

* * * * *